United States Patent
Ariyoshi et al.

(10) Patent No.: US 6,807,133 B2
(45) Date of Patent: Oct. 19, 2004

(54) OPTICAL HEAD AND OPTICAL DISK APPARATUS

(75) Inventors: Tetsuo Ariyoshi, Kokubunji (JP); Mariko Umeda, Tokyo (JP); Takeshi Shimano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 360 days.

(21) Appl. No.: 09/921,142

(22) Filed: Aug. 3, 2001

(65) Prior Publication Data

US 2002/0176331 A1 Nov. 28, 2002

(30) Foreign Application Priority Data

May 28, 2001 (JP) ........................................ 2001-159110

(51) Int. Cl.$^7$ ................................................ G11B 7/00
(52) U.S. Cl. ............................ 369/44.42; 369/44.41; 369/44.23; 369/112.12
(58) Field of Search ........................ 369/44.23, 44.37, 369/44.41, 112.12, 44.42

(56) References Cited

U.S. PATENT DOCUMENTS 6,185,167 B1 * 2/2001 Arai et al. ............... 369/44.23

\* cited by examiner

*Primary Examiner*—Susan McFadden
*Assistant Examiner*—J. L. Ortiz-Criado
(74) *Attorney, Agent, or Firm*—Antonelli, Terry, Stout & Kraus, LLP

(57) ABSTRACT

To stably carry out recording and reproducing to and from a high density optical disk without using a double servo in the optical disk using a high NA objective lens. A detection of a spherical aberration and a detection of a coma aberration in a radial direction are simultaneously performed, and the coma aberration generated with the offset of an objective lens 109 is corrected in real time, thus enlarging an allowable offset amount of the objective lens. In order to simultaneously detect the spherical aberration and the coma aberration, focal shift and tracking shift signals in an inside region and outside region of reflected light flux are detected respectively, and the differential signals are set as spherical aberration and coma aberration signals.

4 Claims, 14 Drawing Sheets

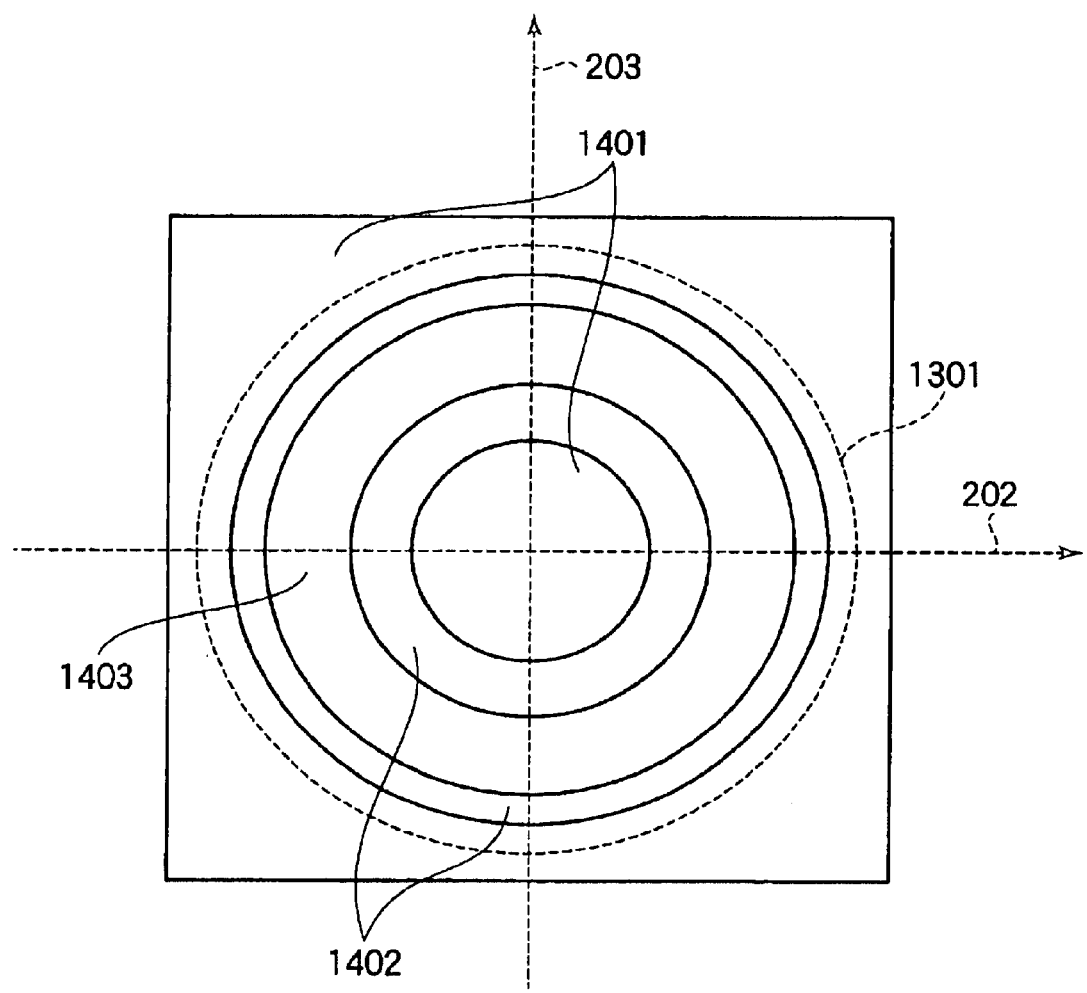

OPTICAL HEAD AND OPTICAL DISK APPARATUS

BACKGROUND OF THE INVENTION

1. Field of the Invention

The present invention relates to an optical disk apparatus, which records and reproduces information by use of laser beam, and to an optical head incorporated in the optical disk apparatus.

2. Prior Art

As a recording machine prevalent currently, a recording machine utilizing a videotape is in popular use. However, a recording machine utilizing an optical disk has been commercially available. The optical disk is more superior to the videotape in random access performance. From viewpoints of a easiness to handle, a repetitive reproduction, a fact that an image deterioration scarcely occurs due to change over time, compactness, or the like, it is considered that the recording machine using the optical disk will widely spread in the future. Furthermore, in addition to the recording, an optical disk apparatus is utilized for various kinds of applications such as an external recording device of a computer, a recording/reproducing apparatus of musical information, or the like. Therefore, it is considered that the optical disk apparatus gains increasingly in importance in the future.

In Japan, targeting at around Year 2003 to 2005, in a television broadcast, digitization of a satellite broadcasting, and digitization of a ground wave broadcasting are likely to be realized. Currently, a broadcast of higher definition moving pictures than a present analog broadcast will be widespread in ordinary homes, and thus it is considered that a demand for digitally recording this high definition moving picture will increase. In order to record this high definition moving picture for about 2 hours without impairing the quality of images, it is necessary that a large capacity storage of 20 to 25 GB in capacity is provided in a disk having a diameter of 12 cm which has the same size as a compact disk or DVD. In other words, it is necessary that the recording density is increased about 4 to 5 times the present DVD.

In order to increase the recording density, it is necessary that the laser beam source is shortened in wavelength, NA (numerical aperture) of the objective lens is increased, and a spot diameter for recording/reproducing information is reduced. At present, the wavelength of the laser beam source of DVD is about 660 nm, NA of the objective lens is about 0.6, and thus the recording capacity of 4.7 GB in one layer on single side is attained. On the other hand, as the laser beam source of short wavelength, a blue-violet semiconductor laser (wavelength 400 nm) is likely to be put into practical use. When this laser beam source is used, if NA is set to 0.85, 25 GB in one layer on single side can be accomplished.

As a prior art of increasing the NA of the objective lens, it is disclosed in, for example, Japanese Patent Application Laid-Open No. 2000-11402. Here, the NA is increased up to maximum 0.85 by use of the objective lenses of two elements. At this time, there is a problem that, the more the NA increases, the more an aberration generated due to a positional shift of an optical system, error of thickness and tilt of a disk substrate, or the like increases. In view of this problem, in the aforementioned prior art, in order to reduce a coma aberration generated due to the disk tilt, thickness of the substrate is thinned down to 0.1 mm. Moreover, as for a spherical aberration generated by error of thickness of the substrate, thickness of the substrate is detected from a difference between the focal shift signals of a surface of the disk and a record surface, and a position of a collimator lens is changed based thereon to compensate the spherical aberration.

In the aforementioned prior art, when the objective lens is offset from a central axis of the collimator lens in tracking operation in a state that the spherical aberration is corrected, the coma aberration occurs in a direction of shifting the objective lens. In the case where the spherical aberration due to the error of the substrate thicknesses is corrected, an amount of the coma aberration by this offset is small. However, in the case where the correction amount is relatively large as when the spherical aberration equivalent to an interlayer interval is corrected in recording and reproducing to and from two-layer disk, the coma aberration by this offset is affected largely, and a spot is deteriorated by the tracking operation, whereby the recording and reproducing of signals are adversely affected.

In order to reduce the influences of the coma aberration due to the offset of the objective lens, it is necessary to adopt a double servo system in which the optical head itself makes the tracking operation in conformity to revolution of the optical disk. However, since the optical head itself is moved in the double servo system, a mechanism system and a control system become complicated, and costs increase. Furthermore, since a movable part is large, this system is unfit for an increase in speed.

SUMMARY OF THE INVENTION

The present invention has been made in view of drawbacks in the aforementioned prior art. It is an object of the present invention to provide an optical head, in which a high NA objective lens is incorporated, and which is suitable for increasing a speed at low costs, and to provide an optical disk apparatus incorporating the same.

According to the present invention, there are provided a mechanism which detects and corrects the spherical aberration due to an error of substrate thicknesses or the spherical aberration generated when recording and reproducing to and from a recording layer consisting of a plurality of layers, and further a mechanism which detects and corrects simultaneously the coma aberration also generated by offset of the objective lens by the tracking operation, thereby attaining the aforementioned objects.

According to the present invention, when the spherical aberration is corrected, since the coma aberration generated by offset of the objective lens decreases, the double servo becomes unnecessary. Therefore, it is possible to realize the high density optical head suitable for an increase in speed at low costs.

The optical head, the information reproducing apparatus, and the information recording/reproducing apparatus according to the present invention have the following characteristics.

(1) The optical head comprises: a laser beam source; an objective lens for condensing beam from the laser beam source on an optical disk; and a detector for detecting reflected light from the optical disk, and further comprises: means for generating a first focal shift signal and a first tracking an error signal by use of an inside light flux containing a light flux center of the reflected light out of the reflected light from the optical disk; and means for generating a second focal shift signal and a second tracking shift signal by use of an outside light flux enclosing the inside light flux out of the reflected light from the optical disk.

(2) In the optical head according to (1), a spherical aberration signal is generated based on a difference between the first focal shift signal and the second focal shift signal, and a coma aberration signal is generated based on a difference between the first tracking shift signal and the second tracking shift signal.

(3) The optical head comprises: a laser beam source; an objective lens for condensing beam from the laser beam source on an optical disk; variable focusing means for moving a focal position of an optical spot condensed by the objective lens; tracking means for making the optical spot track a recording track of the optical disk; a light detector for detecting reflected light from the optical disk; and an operation circuit for generating a reproducing signal, a focal shift signal and a tracking shift signal by use of a detection signal of the light detector. The optical head further comprises: a detected light dividing device for dividing a light flux in the vicinity of an optical axis of the reflected light into a plurality of partial light fluxes to make incident onto the light detector, and also dividing the light flux in a peripheral portion of the reflected light into a plurality of partial light fluxes to make incident onto the light detector. In this case, the operation circuit generates: a first focal shift signal and a first tracking shift signal based on the detection signal of the partial light fluxes derived from the light flux in the vicinity of the optical axis; a second focal shift signal and a second tracking shift signal based on the detection signal of the partial light fluxes derived from the light flux of the peripheral portion; a spherical aberration signal according to a difference signal between the first and second focal shift signals, and a focal shift signal according to a sum signal; and a coma aberration signal according to a difference signal between the first and second tracking shift signals, and a tracking shift signal according to a sum signal.

(4) In the optical head according to (3), the detected light dividing device is divided into 8 regions by a circle, a straight line passing a center of the circle and parallel to a direction relevant to a radial direction of the optical disk, and a straight line passing a center of the circle and parallel to a direction relevant to a revolution direction of the optical disk, and the respective regions are diffraction gratings or polarizing diffraction gratings having different diffraction angles and diffraction directions from each other.

(5) In the optical head according to (4), the light detector has a plurality of light-receiving regions provided in one substrate, generates a reproducing signal from a zero-order diffraction light detection signal of the detected light dividing device, and generates a focal shift signal and a tracking shift signal from ± first-order diffraction light detection signals.

If a light detector having a constitution, in which a plurality of light-receiving regions are formed on one substrate, the reproducing signal is detected by the zero-order diffraction light of the detected light dividing device, and the focal shift signal and tracking shift signal are detected by the ± first-order diffraction light as described above, is used as a light detector, it becomes possible to relatively reduce noises of the reproducing signal. In addition, the number of optical light-receiving devices requiring an adjustment becomes only one, and thus it becomes possible to suppress manufacturing costs.

(6) The information reproducing apparatus comprises: a laser beam source; an objective lens for condensing beam from the laser beam source on an optical disk; variable focusing means for moving a focal position of an optical spot condensed by the objective lens; tracking means for making the optical spot track a recording track of the optical disk; spherical aberration adding means for adding a variable spherical aberration to light condensed by the objective lens; coma aberration adding means for adding a variable coma aberration to light condensed by the objective lens; a light detector for detecting reflected light from the optical disk; an operation circuit for generating a reproducing signal, a focal shift signal and a tracking shift signal from a detection signal of the light detector; and servo-control means for controlling the variable focusing means, the tracking means, the spherical aberration adding means and the coma aberration adding means. The information reproducing apparatus further comprises: a detected light dividing device for dividing a light flux in the vicinity of an optical axis of the reflected light into a plurality of partial light fluxes to make incident onto the light detector, and also dividing the light flux in a peripheral portion of the reflected light into a plurality of partial light fluxes to make incident onto the light detector. In this case, the operation circuit generates: a first focal shift signal and a first tracking shift signal based on a detection signal of the partial light fluxes derived from the light flux in the vicinity of the optical axis; a second focal shift signal and a second tracking shift signal based on the detection signal of the partial light fluxes derived from the light flux of the peripheral portion; a spherical aberration signal according to a difference signal between the first and second focal shift signals, and a focal shift signal according to a sum signal; and a coma aberration signal according to a difference signal between the first and second tracking shift signals, and a tracking shift signal according to a sum signal. Moreover, the servo-control means controls: the variable focusing means according to the focal shift signal; the tracking means according to the tracking shift signal; the spherical aberration adding means according to the spherical aberration signal; and the coma aberration adding means according to the coma aberration signal.

(7) In the information reproducing apparatus according to (6), the detected light dividing device is divided into 8 regions by a circle, a straight line passing a center of the circle and parallel to a direction relevant to a radial direction of the optical disk, and a straight line passing a center of the circle and parallel to a direction relevant to a revolution direction of the optical disk, and the respective regions are diffraction gratings or polarizing diffraction gratings having different diffraction angles and diffraction directions from each other.

(8) In the information reproducing apparatus according to (7), the light detector has a plurality of light-receiving regions on one substrate, generates a reproducing signal from a zero-order diffraction light detection signal of the detected light dividing device, and generates the focal shift signal and tracking shift signal from the ± first-order diffraction light detection signal.

(9) The information recording/reproducing apparatus comprises: a laser beam source; an objective lens for condensing beam from the laser beam source on an optical disk; variable focusing means for moving a focal position of an optical spot condensed by the objective lens; tracking means for making the optical spot track a recording track of the optical disk; spherical aberration adding means for adding a variable spherical aberration to light condensed by the objective lens; coma aberration adding means for adding a variable coma aberration to light condensed by the objective lens; a light detector for detecting reflected light from the optical disk; an operation circuit for generating a reproducing signal, a focal shift signal and a tracking shift signal from a detection signal of the light detector; servo-control means for controlling the variable focusing means, the tracking means, the spherical aberration adding means and the coma aberration adding means; and a laser drive circuit for driving the laser beam source according to a signal modulated by a record signal. The information recording/reproducing apparatus further comprises: a detected light dividing device for dividing a light flux in the vicinity of an optical axis of the reflected light into a plurality of partial light fluxes to make incident onto the light detector, and also dividing the light flux in a peripheral portion of the reflected light into a plurality of partial light fluxes to make incident onto the light detector. In this case, the operation circuit generates: a first focal shift signal and a first tracking shift signal based on a detection signal of the partial light fluxes derived from the light flux in the vicinity of the optical axis; a second focal shift signal and a second tracking shift signal based on the detection signal of the partial light fluxes derived from the light flux of the peripheral portion; a spherical aberration signal according to a difference signal between the first and second focal shift signals, and a focal shift signal according to a sum signal; and a coma aberration signal according to a difference signal between the first and second tracking shift signals, and a tracking shift signal according to a sum signal. Moreover, the servo-control means controls: the variable focusing means according to the focal shift signal; the tracking means according to the tracking shift signal; the spherical aberration adding means according to the spherical aberration signal; and the coma aberration adding means according to the coma aberration signal.

(10) In the information recording/reproducing apparatus according to (9), the detected light dividing device is divided into 8 regions by a circle, a straight line passing a center of the circle and parallel to a direction relevant to a radial direction of the optical disk, and a straight line passing a center of the circle and parallel to a direction relevant to a revolution direction of the optical disk, and the respective regions are diffraction gratings or polarizing diffraction gratings having different diffraction angles and diffraction directions from each other.

(11) In the information recording/reproducing apparatus according to (10), the light detector has a plurality of light-receiving regions in one substrate, generates a reproducing signal from a zero-order diffraction light detection signal of the detected light dividing device, and generates the focal shift signal and tracking shift signal from the +first-order diffraction light detection signal.

(12) A servo-control method for making an optical spot condensed by an objective lens track a recording track of an optical disk comprises the steps of: detecting a first focal shift signal and a first tracking shift signal by use of an inside light flux containing a light flux center of the reflected light out of the reflected light from the optical disk; detecting a second focal shift signal and a second tracking shift signal by use of an outside light flux enclosing the inside light flux out of the reflected light from the optical disk; controlling a focal position of the optical spot according to a sum signal of the first and second focal shift signals; controlling a tracking of the optical spot according to a sum signal of the first and second tracking shift signals; adding a spherical aberration to light condensed by the objective lens according to a spherical aberration signal generated based on a difference between the first and second focal shift signals; and adding a coma aberration to light condensed by the objective lens according to a coma aberration signal generated based on a difference between the first and second tracking shift signals.

BRIEF DESCRIPTION OF THE DRAWINGS

FIG. 14 is a view showing a pattern of the liquid crystal spherical aberration correction device for use in the optical head of the present invention.

DETAILED DESCRIPTION OF THE PREFERRED EMBODIMENT

Hereinafter, embodiments of the present invention will be described with reference to the drawings.

Figure 1:
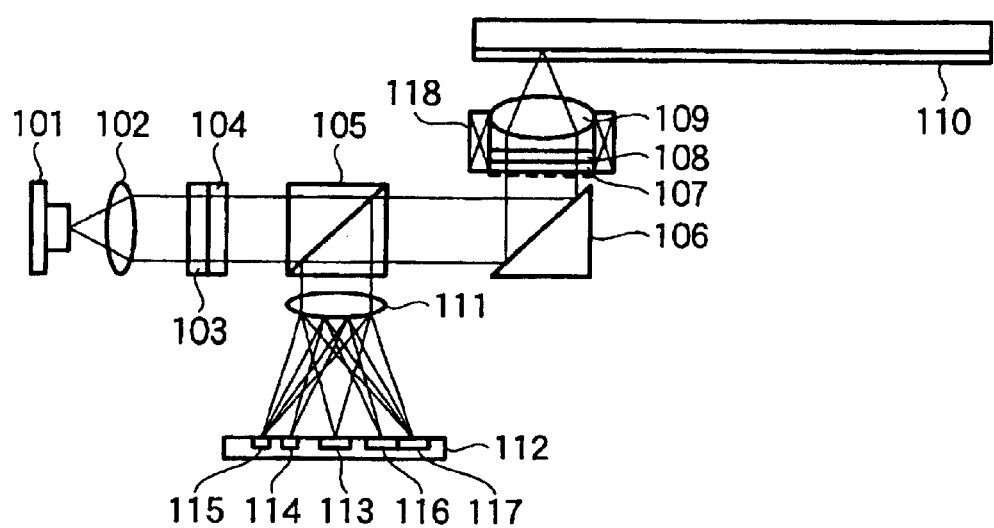
FIG. 1 is a schematic view showing one example of an optical system of an optical head according to the present invention.

FIG. 1 is a schematic view showing one example of an optical system of an optical head according to the present invention. Laser beam emitted from a blue-violet semiconductor laser 101 of a wavelength of 400 nm is collimated to a substantially parallel beam by a collimator lens 102. The beam passed through a polarizing beam splitter 105 is reflected upward toward an optical disk medium 110 by a raising mirror 106, and become substantially circularly polarized light by a λ/4 wavelength plate 108, and are condensed on an information recording surface of the optical disk medium 110 by an objective lens 109 (NA 0.85, optimal substrate thickness 0.1 mm). The reflected light from the information recording surface is returned to the objective lens 109 again, and becomes linearly polarized light perpendicular to a polarizing direction at the incident time by the λ/4 wavelength plate 108. A polarizing diffraction grating 107 acts only on the polarizing direction of the reflected light from the optical disk medium, and diffraction angles and diffraction directions are set different in correspondence to a transmitting region. The ± first-order light diffracted by the polarizing diffraction grating 107 and zero-order light not receiving a diffraction action is reflected by the polarizing beam splitter 105, and is condensed on a detector 112 by a detection lens 111.

In the detector 112, formed are a light-receiving region 113 for a reproducing signal, a light-receiving region 114 for a focus positional shift signal of an inside light flux, a light-receiving region 115 for a focus positional shift signal of an outside light flux, a light-receiving region 116 for a tracking shift signal of the inside light flux, and a light-receiving region 117 for a tracking shift signal of the outside light flux. It is possible to obtain a focus positional shift signal by taking up a sum signal of the focus positional shift signal of the inside light flux and the focus positional shift signal of the outside light flux, and to obtain a spherical aberration signal by taking up a difference signal thereof. Furthermore, it is possible to obtain the tracking shift signal by taking up a sum signal of the tracking shift signal of the inside light flux, and the tracking shift signal of the outside light flux, and to obtain a coma aberration signal by taking up a difference signal thereof.

An objective lens actuator 118 is driven in an optical axis direction so that the focus positional shift signal is set to 0, and the objective lens actuator 118 is driven in a radial direction of the optical disk medium 110 so that the tracking shift signal is set to 0. Furthermore, the spherical aberration signal is set as a drive signal, and a spherical aberration correction device 104 is driven so that a spherical aberration is made as small as possible on an information recording surface of the optical disk medium 110. Furthermore, the coma aberration signal is set as a drive signal, and a coma aberration correction device 103 is driven so that a coma aberration is made as small as possible on the information recording surface of the optical disk medium 110.

As the spherical aberration correction device 104, for example, as mentioned in Jpn. J. Appl. Phys., 39 (2000) 937, an optical system, in which the degrees of convergence and emission of the light flux making incident onto the objective lens are regulated by driving a lens provided in an optical path reaching a collimator lens or an objective lens in an optical axis direction, whereby the spherical aberration is added, can be used as the spherical aberration correction device 104. Furthermore, a spherical correction device using a liquid crystal optical device as mentioned in Jpn. J. Appl. Phys., 38 (1999) 1744 may be used. Similarly, a coma aberration correction device using a liquid crystal optical device as mentioned in Jpn. J. Appl. Phys., 38 (1999) 1744 may be used for the coma aberration correction device 103. According to this embodiment, a liquid crystal aberration correction device which can simultaneously correct the coma aberration and spherical aberration in the radial direction is used. Thus, an adjustment of the aberration correction optical system is reduced and the number of parts or components is lessened.

Figure 13:
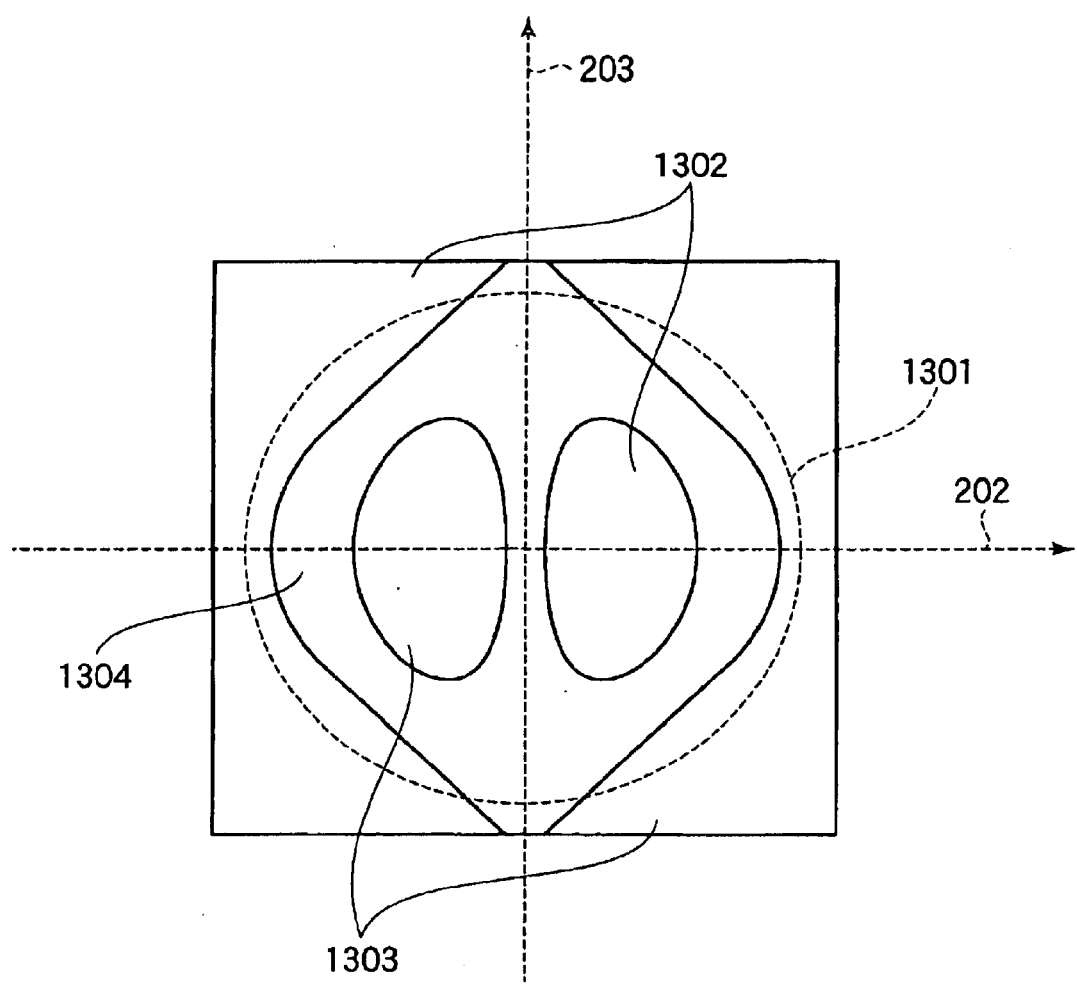
FIG. 13 is a view showing a pattern of a liquid crystal coma aberration correction device for use in the optical head of the present invention.

The coma aberration correction device 103 is divided in patterns shown in FIG. 13, for example, and a phase of light transmitting through respective regions can be varied in each division region. With respect to a direction 202 relevant to a radial direction of an optical disk medium, a direction 203 relevant to a revolution direction of the optical disk medium, and an objective lens effective light flux diameter 1301, a division region is set in a shape as in FIG. 13. Also, an added phase amount of a region 1304 is set 0, and the added phase amount of a region 1302 and the added phase amount of a region 1303 are set so as to have an equal absolute value with reverse positive and negative signs. When an optimal phase amount is added in such the patterns, the coma aberration can be reduced to about ½. Furthermore, the coma aberration can be reduced to ⅓ or less by fining the pattern or using a liquid crystal device which is called a gradation type, in which the phase is changed gradually.

The spherical aberration correction device 104 is divided in patterns as shown in FIG. 14, for example. With respect to the direction 202 relevant to the radial direction of the optical disk medium, the direction 203 relevant to the revolution direction of the optical disk medium, and the objective lens effective light flux diameter 1301, a division region is set in a concentric circle shape as shown in FIG. 14. Also, the added phase amount of a region 1401 is set 0, and the added phase amount of a region 1403 is set so as to have a doubled absolute value relative to that of a region 1402 with the same sign. When an optimal phase amount is added in such the patterns, the coma aberration can be decreased to about ¼. Furthermore, the coma aberration can be decreased to ⅕ or less by fining the pattern or using a liquid crystal device which is called the gradation type, in which the phase is changed gradually.

Figure 2:
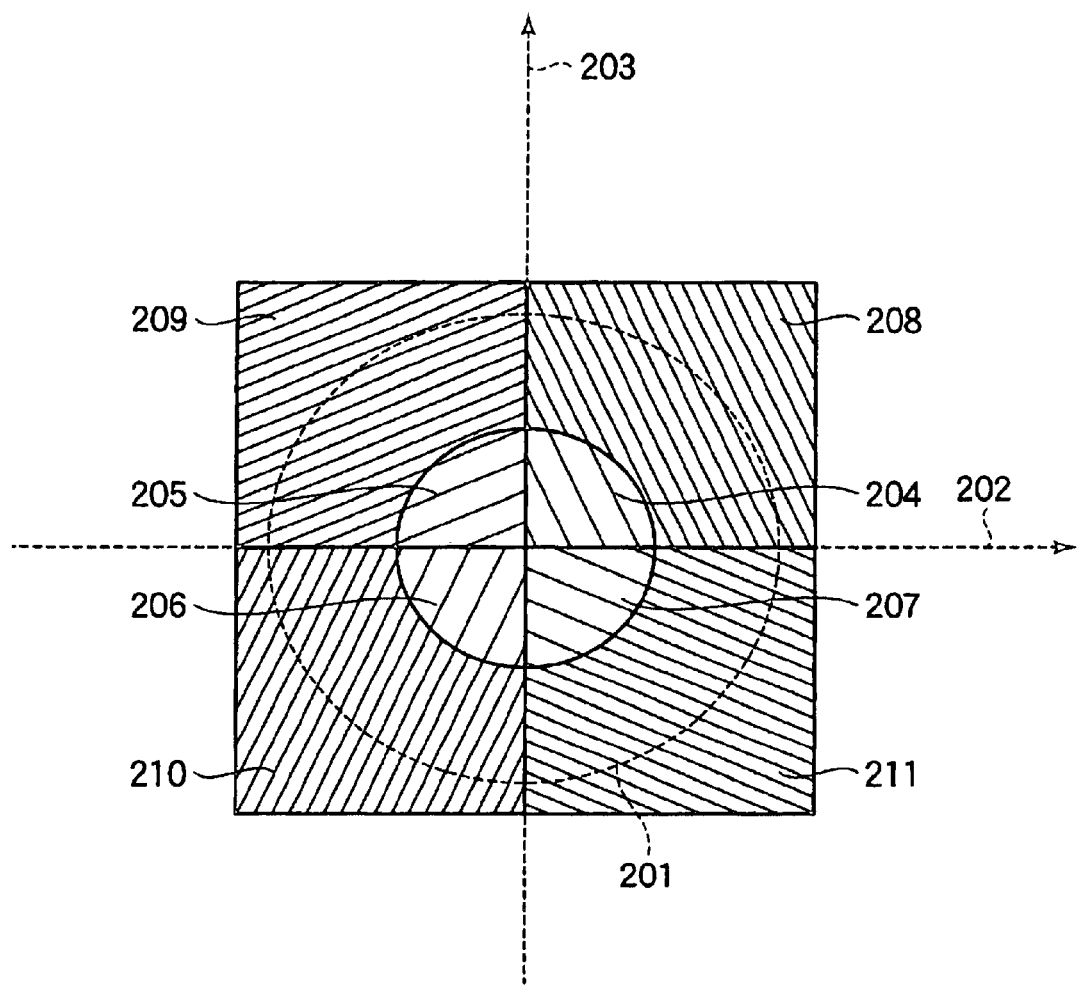
FIG. 2 is a view showing a diffraction pattern of a polarizing diffraction grating for use in the optical head of the present invention.

FIG. 2 shows a light flux division pattern of the polarizing diffraction grating 107. A light flux diameter 201 of the reflected light corresponds with an effective light flux diameter of the objective lens 109, and is 4 mmφ in this embodiment. Arrow 202 corresponds to a radial direction of the optical disk medium 110, and arrow 203 corresponds to a revolution direction of the optical disk medium 110. Based on the center of the light flux of the reflected light, the polarizing diffraction grating 107 is divided into two regions in a concentric circle manner, two regions in the radial direction of the medium, two regions in the revolution direction of the medium, and specifically, eight regions in total, each of which has different diffraction angles and diffraction directions. A diameter of regions 204, 205, 206, 207, which diffract a central part of the light flux is set such that the area of the region is the about half of an area enclosed by the light flux diameter 201. In the case of this embodiment, the diameter of the inside region is 2.8 mmφ.

A diffraction grating period and diffraction direction in the respective regions were set as follows:
Region 204: Period 25 μm, Diffraction direction 22.5°
Region 205: Period 25 μm, Diffraction direction 112.5°
Region 206: Period 25 μm, Diffraction direction 157.5°
Region 207: Period 25 μm, Diffraction direction 67.5°
Region 208: Period 12.5 μm, Diffraction direction 22.5°
Region 209: Period 12.5 μm, Diffraction direction 112.5°
Region 210: Period 12.5 μm, Diffraction direction 157.5°
Region 211: Period 12.5 μm, Diffraction direction 67.5°

Here, the diffraction direction was defined as an angle made between a straight line vertical to the diffraction grating and the radial direction 202. Furthermore, a diffraction efficiency was 40% in zero-order diffraction light, 20% in +first-order diffraction light, and 20% in −first-order diffraction light. The reflected light divided by this polarizing diffraction grating 107 is condensed on the detector 112 by the detection lens 111. On the detector 112, eight spots by +first-order diffraction light, eight spots by −first-order diffraction light, and one spot by zero-order diffraction light, 17 spots are formed in total.

Figure 3:
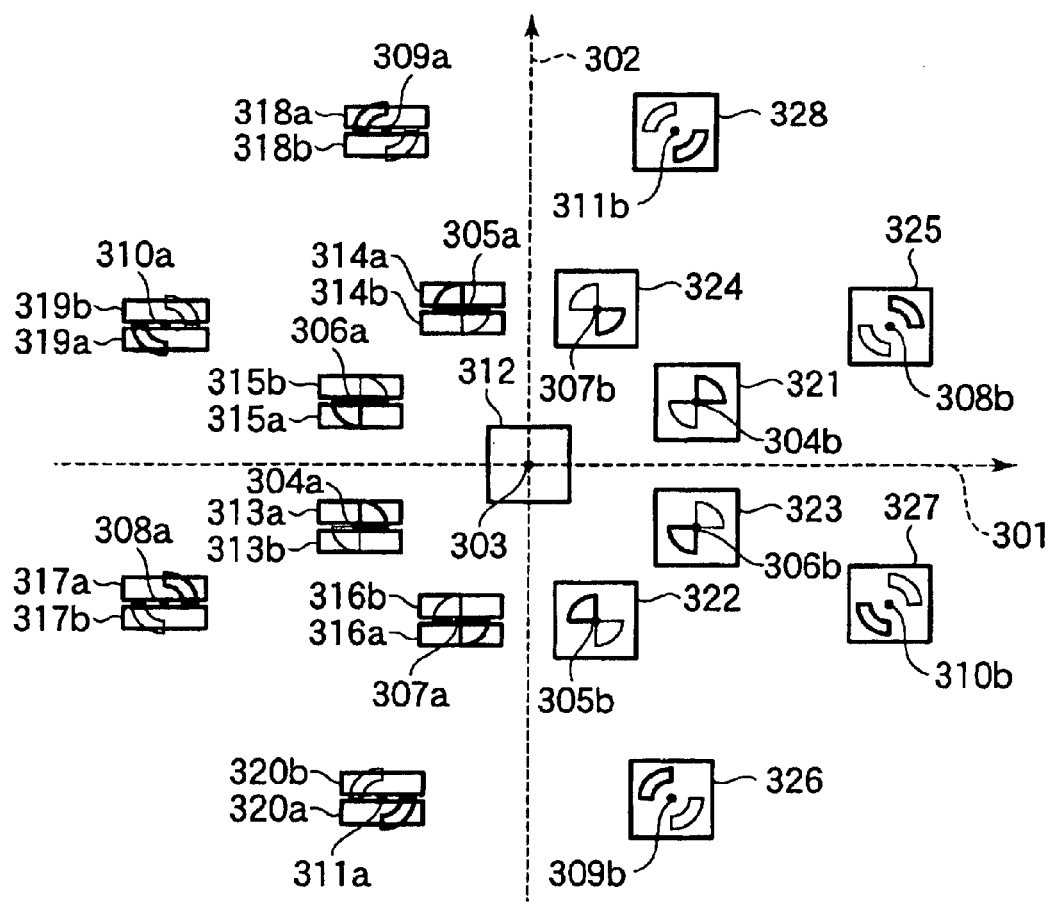
FIG. 3 is a view showing a relation between a light-receiving region pattern of a light detector for use in the optical head of the present invention and a distribution pattern of diffracted light.

FIG. 3 shows a relation between the spots on the detector 112 of these reflected light and the light-receiving portion. When a focal distance of the detection lens 111 is set 20 mm, images of the spots on the detector 112 are formed on the circumference having a radius of 0.32 mm with using a spot by zero-order diffraction light as a center in the regions 204, 205, 206, 207 of the grating period 25 μm, and formed on the circumference having a radius of 0.64 mm with using a spot by zero-order diffraction light as a center in the regions 208, 209, 210, 211 of the grating period 12.5 μm. Arrow 301 in FIG. 3 indicates a radial direction of the optical disk medium 110, and arrow 302 indicates a revolution direction of the optical disk medium 110. Hereinafter, a relation between a transmission region of the polarizing diffraction grating 107 and the spot position on the detector 112 is shown.

Zero-order diffraction light of the regions 204 to 211: spot 303 ±first-order diffraction light of the region 204: spot 304a and spot 304b ±first-order diffraction light of the region 205: spot 305a and spot 305b ±first-order diffraction light of the region 206: spot 306a and spot 306b ±first-order diffraction light of the region 207: spot 307a and spot 307b ±first-order diffraction light of the region 208: spot 308a and spot 308b ±first-order diffraction light of the region 209: spot 309a and spot 309b ±first-order diffraction light of the region 210: spot 310a and spot 310b ±first-order diffraction light of the region 211: spot 311a and spot 311b When the focal position of a recording/reproducing spot formed by the objective lens 109 corresponds with an information recording layer of the optical disk medium 110, the spots in the drawings are represented by dots, and a shape when the information recording surface is close to a side of the objective lens relative to the focal position is represented by a thick line, and a shape when the surface is far from the side of the objective lens is designated by a thin line, typically (the zero-order light is not represented).

Next, a shape of the light-receiving portion on the detector 112 will be explained by use of FIG. 3. A light-receiving portion 312 detects the spot 303 of the zero-order diffraction light, and adjusts so that the spot position comes to a substantially center of a light-receiving portion 312. A size of the light-receiving portion 312 is 100 μm×100 μm. A signal of this light-receiving portion is mainly used as an information reproducing signal. The light-receiving portions 321 to 328 of the substantially same shape are formed so as to detect the spots 304b to 311b. Signals of these light-receiving portions are mainly calculated as a tracking shift signal and a coma aberration detection signal by a push-pull detection method, and are used for tracking control and coma aberration control. The light-receiving portions 313a, 313b have light-receiving regions of 100 μm in a direction of arrow 301 and of 20 μm in a direction of arrow 302, respectively, and dark line portions each having sensitivity are formed at intervals of 20 μm between the light-receiving portions 313a and 313b, and the spot 304a is deposited so as to come to a center of the dark line portion. Similarly, regarding the spot 305a to the spot 311a also, the light-receiving portions 314a, 314b to 320a, 320b having the substantially same structure are formed. Signals obtained from these light-receiving portions 313a, 313b to 320a, 320b are mainly calculated as a focal shift signal and a spherical aberration detection signal, and are used for focal shift control and spherical aberration control. According to this embodiment, a double knife edge method is used as a focal shift detection. When using this focal shift detection method, in comparison to a land and groove record system adopted for DVD-RAM which is repeatedly rewritable and has presently capacity of 4.7 GB in one-layer on single side, the focal shift control can stably be conducted.

Figure 4:
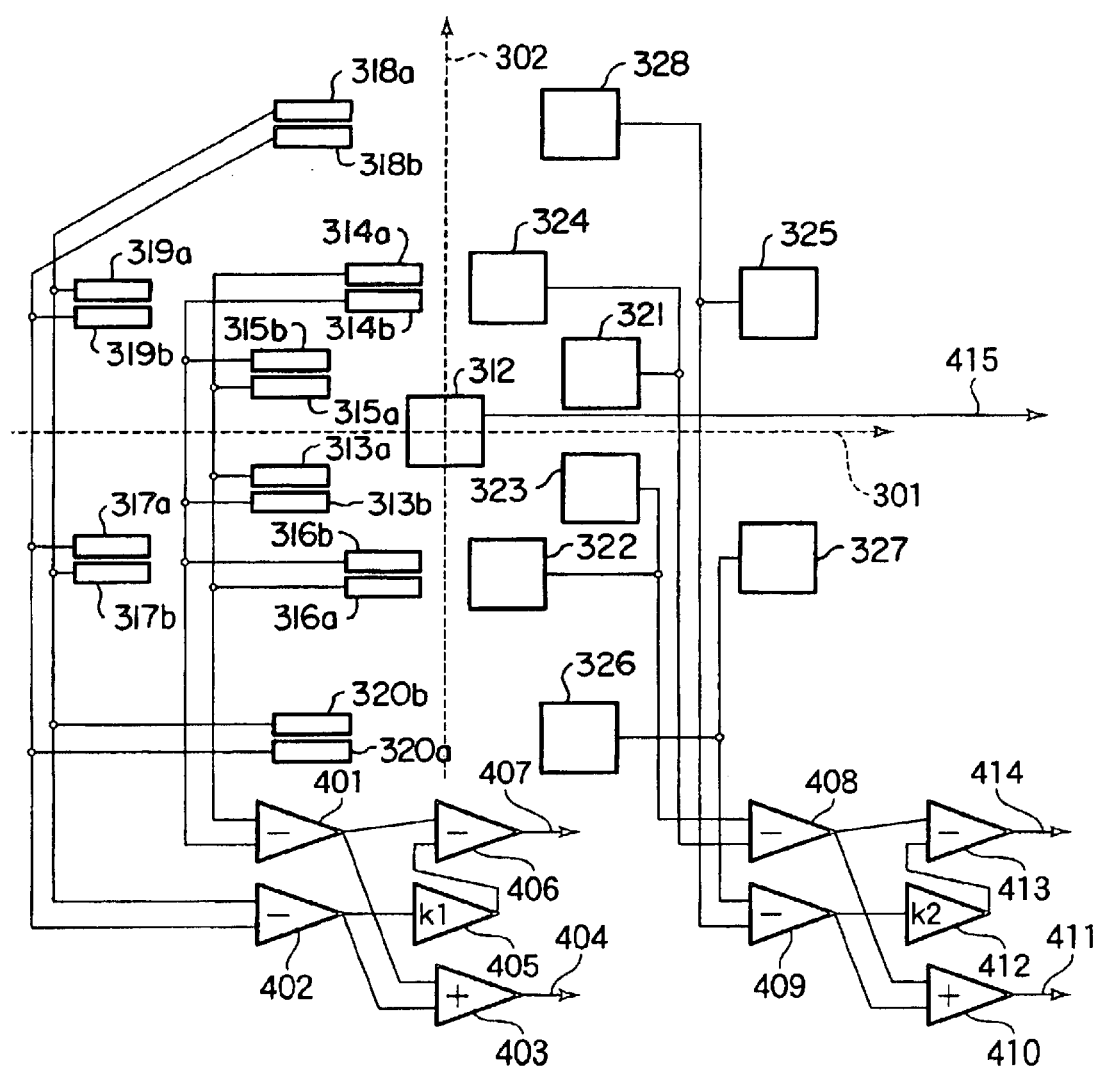
FIG. 4 is a diagram showing an operation circuit of a signal obtained from each light-receiving portion of the light detector.

Next, a method for operating an electric signal obtained by these light-receiving portions will be explained by use of FIG. 4. Signals up to the light-receiving portions 313a to 316a and signals up to the light-receiving portions 313b to 316b are added respectively, to obtain a differential signal by a differential operating unit 401. This signal becomes a focus positional shift signal in a region of a central part of the light flux of the reflected light, which is diffracted by the regions 204 to 207 of the polarizing diffraction grating 107. Similarly, signals up to the light-receiving portions 317a to 320a and signals up to the light-receiving portions 317b to 320b are added respectively, to obtain the differential signal by a differential operating unit 402. This signal becomes a focus positional shift signal in an outside region of the light flux of the reflected light, which is diffracted by the regions 208 to 211 of the polarizing diffraction grating 107. Signals obtained from the differential operating units 401, 402 are added by an addition operating unit 403. This signal 404 is a signal, which is substantially equivalent to a signal obtained by detecting the focus positional shift signal in the entire light flux of the reflected light. A differential operating unit 406 operates a focal shift signal in a region of a central part of the light flux of the reflected light and a focus positional shift signal in an outside region of the light flux of the reflected light to detect a spherical aberration signal 407. However, as light intensity in the outside region is weaker than that of the central region, the light is operated after adjusting a gain by an amplifier 405.

Furthermore, signals of the light-receiving portions 321, 324 and signals of the light-receiving portions 322, 323 are added respectively, to obtain a differential signal by a differential operating unit 408. This signal becomes a tracking shift signal in the central region of the light flux of the reflected light which is diffracted in the regions 204 to 207 of the polarizing diffraction grating 107. Similarly, signals of the light-receiving portions 325, 328 and signals of the light-receiving portions 326, 327 are added respectively, to obtain a differential signal by a differential operating unit 409. This signal becomes a tracking shift signal in the outside region of the light flux of the reflected light, which is diffracted by the regions 208 to 211 of the polarizing diffraction grating 107. The signals obtained by the differential operating units 408, 409 are added by an addition operating unit 410. This signal 411 is a signal, which is substantially equivalent to a signal obtained by detecting the tracking shift signal in the entire light flux of the reflected light. A differential operating unit 413 operates a tracking shift signal in the central region of the reflected light and a tracking shift signal in the outside region of the light flux of the reflected light to detect a coma aberration signal 414. However, as light intensity in the outside region is weaker than that of the central region, they are operated after adjusting a gain by an amplifier 412. A signal of the light-receiving portion 312 is output as an information reproducing signal 415.

Figure 5:
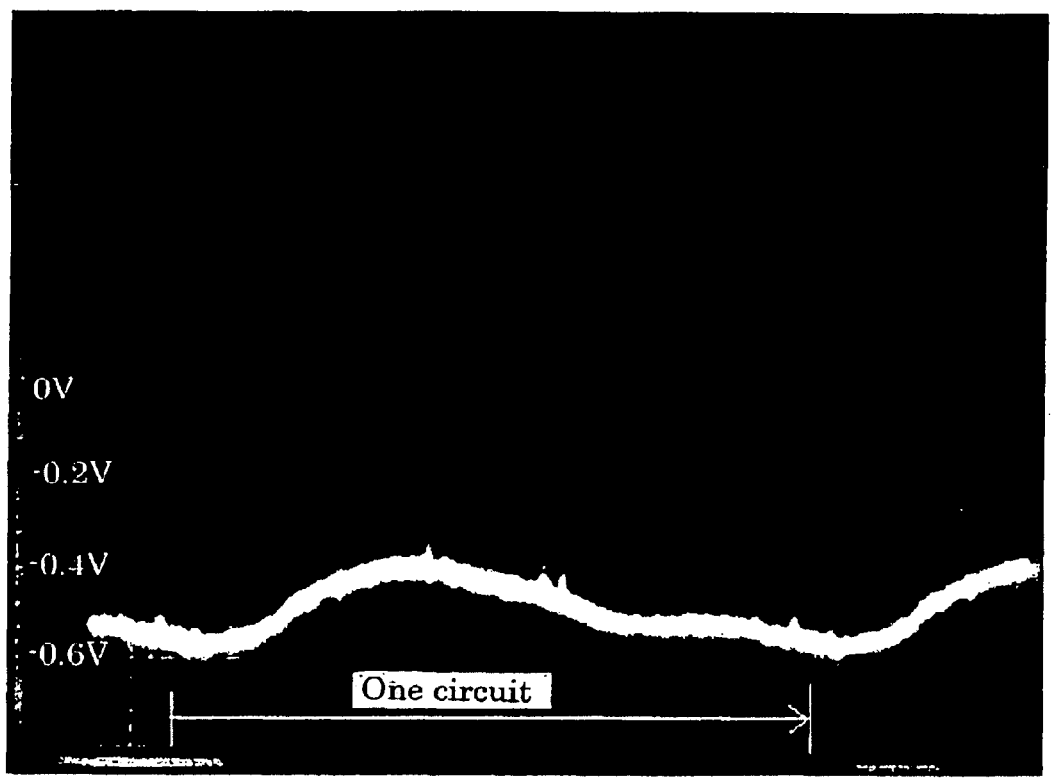
FIG. 5 is an oscilloscope photograph showing a measured experimental result of a signal obtained from a spherical aberration signal detection system.
Figure 6:
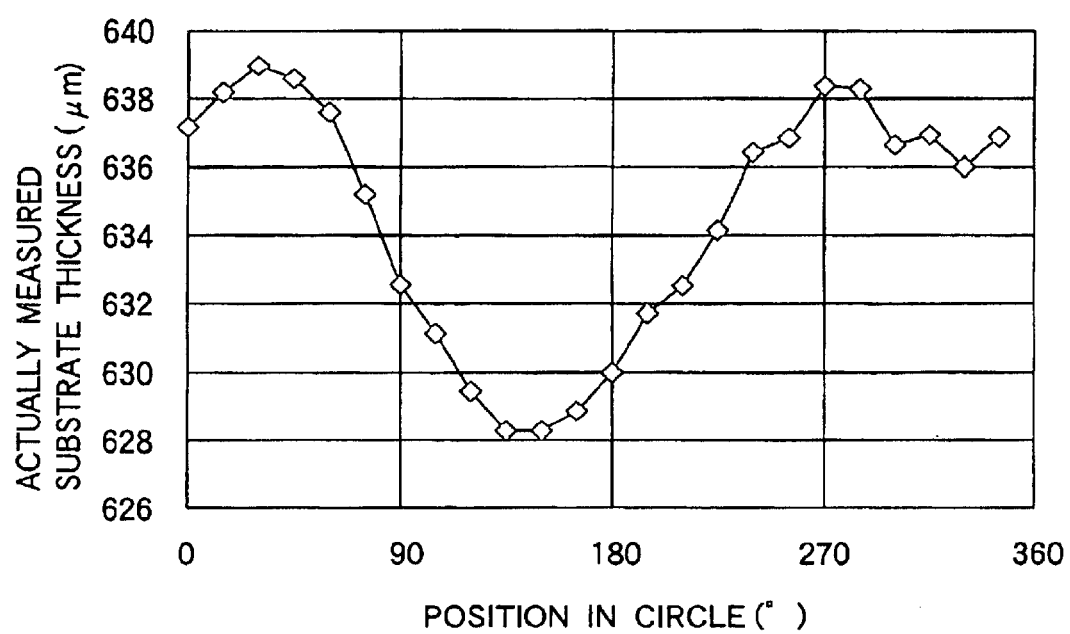
FIG. 6 is a graph showing an actually measured value of a substrate thickness of an optical disk medium used for the measuring experiment of a spherical aberration signal.
Figure 7:
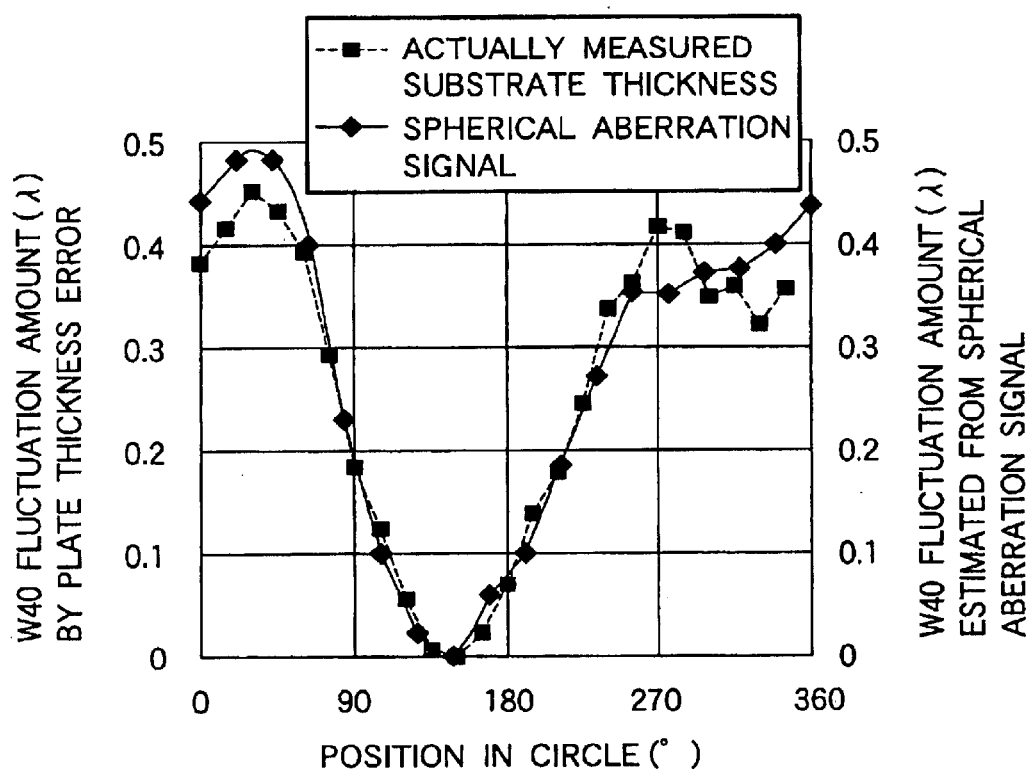
FIG. 7 is a graph showing a comparison result of a change amount of the spherical aberration signal and a fluctuation amount of the substrate thickness.

Next, a spherical aberration signal to be obtained actually will be described. By use of a principle experiment optical head in which the objective lens 109 of the optical head in the aforementioned embodiment is set so as to have NA of 0.65 and optimal substrate thickness of 0.6 mm, the spherical aberration signal 407 was actually detected. FIG. 5 shows an oscilloscope photograph of the detection result. It is considered that the spherical aberration signal changes as in FIG. 5 in accordance with a substrate thickness irregularity in one round of the optical disk medium. FIG. 6 shows the result that substrate thickness of the optical disk medium of this measuring portion was actually measured. FIG. 7 shows the result that a change amount of the spherical aberration generated from this substrate thickness irregularity was compared with a fluctuation amount of the spherical aberration signal. The spherical aberration is provided by a liquid crystal spherical correction device, and based on the change amount of the spherical aberration signal at this time, the change amount of the spherical aberration signal to the spherical aberration is estimated. One wavelength (λ) of laser beam is set to 1 in the axis of ordinate of FIG. 7. As apparent from the result shown in FIG. 7, according to the spherical aberration detection method in this embodiment, the spherical aberration generated due to the substrate thickness irregularity can be detected with fairly high accuracy. Since plate thickness error is affected in proportion to the fourth power of NA, when the objective lens of NA 0.85 in the embodiment is used, it becomes 6.6 times as strict as that of DVD-RAM, or the like. In the standard of the DVD-RAM, the substrate thickness irregularity is defined as ±30 μm or less, but in the case of this embodiment, it is ±4.5 μm or less, and manufacturing error is very strict. For this reason, it is considered that manufacturing cost of the medium is much increased. In order to loosen this manufacturing error as much as possible, and produce large quantities of medium at low cost, it is necessary that the spherical aberration generated due to the substrate thickness irregularity is corrected on a side of the optical head.

Figure 8:
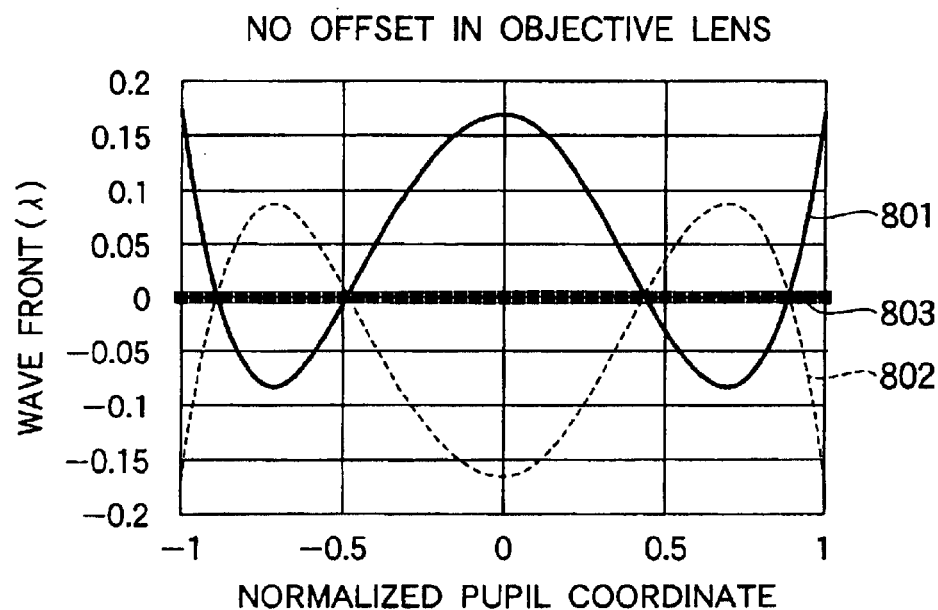
FIG. 8 is graphs for explaining a reason why a coma aberration occurs due to the offset of an objective lens at the time of spherical aberration correction.
Figure 8:
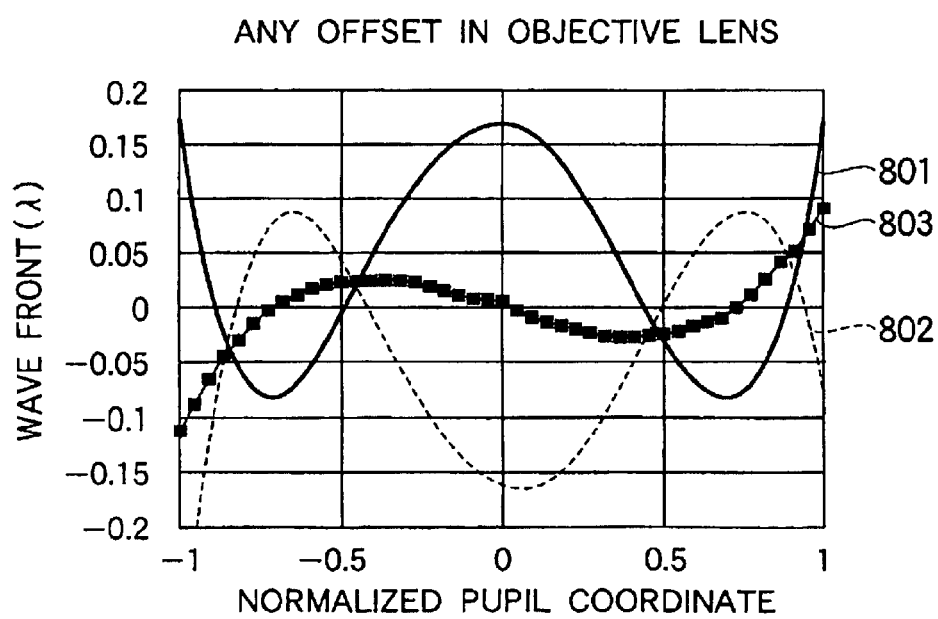

Next, by using FIG. 8, description will be made for the fact that at the time of the spherical aberration correction, the coma aberration is generated in principle by the offset of the objective lens. Assuming a symmetry of the optical axis on a pupil surface of the objective lens 109, coordinate R ($-1 \leq R \leq 1$) normalized in an effective light flux radius of the objective lens in a radial direction is considered. As for a wave front when the spherical aberration occurs due to the substrate thickness variation, or the like, when a reference sphere minimizing an rms wave front aberration is taken up, the wave front is represented by a wave front 801. The spherical aberration of a wave front 802 is provided to incident light by the spherical aberration correction device so as to cancel this spherical aberration, whereby an aberration disappears in a total wave front 803, and thus a good recording/reproducing characteristic is obtained. When the objective lens 109 is offset to a radial direction of the optical disk medium 110 in tracking operation, central positions of the wave fronts 801, 802 shift, and are not completely cancelled each other, so that the wave front represented by 803 remains. As this wave front is represented almost by a cubic function of a normalization pupil coordinate, it is proved that the coma aberration generated in a radial direction of the optical disk medium is a major component.

An amount of the coma aberration generated due to the offset of the objective lens at the time of the spherical aberration correction is obtained analytically. When the coordinates normalized in the pupil diameter is set as x, y, and $R^2=x^2+y^2$ is set, in the case where the reference sphere minimizing the rms wave front aberration is taken up, the spherical aberration is represented by $W_{40}(R^4-R^2+1/6)$. Here, $W_{40}$ is a third order spherical aberration coefficient of Seidel. When the spherical aberration—$W_{40}(R^4-R^2+1/6)$ is added by the spherical aberration correction device, the spherical aberrations are cancelled each other, and thus the good recording/reproducing characteristic is obtained. When the objective lens is offset, and the coordinate is $R'^2=(x-d)^2+y^2$, the residual wave front is $W_{40}(R'^4-R'^2+1/6)-W_{40}(R^4-R^2+1/6)$. When this is expanded, the term of $R^4$ is vanished. In other words, a spherical aberration component is cancelled. Since the term of $R^2$, the term of x and constant do not contribute to the rms wave front aberration by selecting appropriately the reference sphere, these are ignored here. The remaining factors are the term of coma aberration $R^2x$ and astigmatism $x^2$, and respective coefficients are $4dW_{40}$ and $4d^2W_{40}$. A value of d is the offset by the tracking operation, and about 300 μm is required in a system, in which a double servo is not conducted. As an effective light flux radius is 2 mm according to this embodiment, d is 0.15 at the maximum. As the astigmatism coefficient acts by the second power of d, this can be ignored.

From the aforementioned relational equation, the coma aberration generated when the spherical aberration represented by the spherical aberration coefficient $W_{40}$ is corrected is represented as: the coma aberration coefficient $W_{31}=4dW_{40}$, and it is proved that the coma aberration is in proportion to the spherical aberration correction amount and the offset amount of the objective lens. Here, $W_{31}$ is a third order coma aberration coefficient of Seidel. When an allowance of the rms wave front aberration by the offset coma aberration is set to 0.03λ or less, a coefficient of the allowable offset coma aberration is set to 0.25λ or less, and when d=0.15, and a maximum value of $W_{40}$ is 0.42λ. This spherical aberration amount corresponds to the substrate thickness variation of ±6.8 μm, and an allowable substrate thickness variation amount can be enlarged from ±4.5 μm to ±11.3 μm by correcting the spherical aberration.

However, in order to make a two-layer recording for a single side to double the capacity further, required is a spherical aberration correction amount three times as large as that described above. For example, when an intermediate layer between the two recording layers is set to 20 μm, allowable error of the intermediate layer is set to ±5 μm, and an allowable substrate thickness variation is set to ±10 μm, it is necessary that the spherical aberration equivalent to, if simply calculated, ±20.5 μm is corrected. In other words, since the spherical aberration to be corrected is three times that of the aforementioned example, an allowable offset amount is ⅓. For this reason, the double servo, in which the optical head itself is made to follow in correspondence to the offset of the optical disk medium to suppress the offset amount of the objective lens within the allowable degree is essential. Thus, the control of the optical disk apparatus becomes complicated, and cost is increased. Furthermore, it is unfit for increasing the speed. The optical head according to the present invention detects the coma aberration in a disk radial direction (tracking direction), which is generated due to the offset of the objective lens at the time of the spherical aberration correction, and corrects the coma aberration as well, whereby an allowable offset amount of the objective lens is enlarged, and thus the good recording/reproducing characteristic can be obtained without the double servo.

Figure 9:
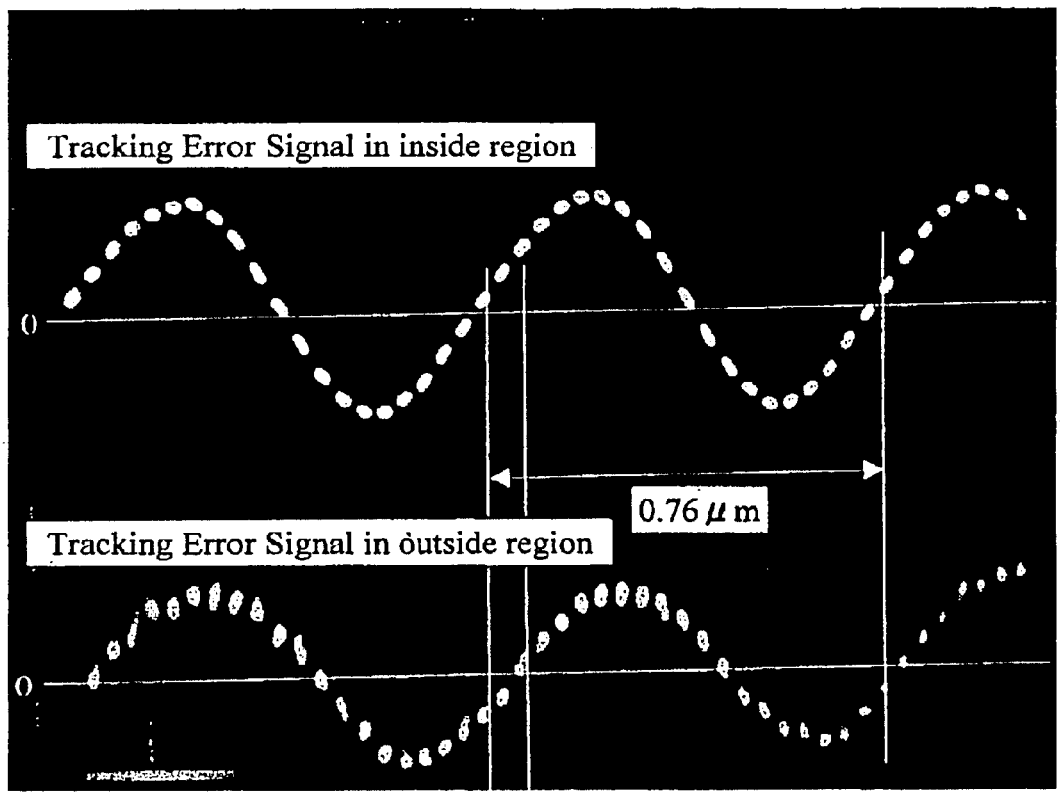
FIG. 9 is a photograph showing a result of the measurement of a tracking error signal in an inside region of light flux and the tracking error signal in an outside region thereof when the coma aberration is present.
Figure 10:
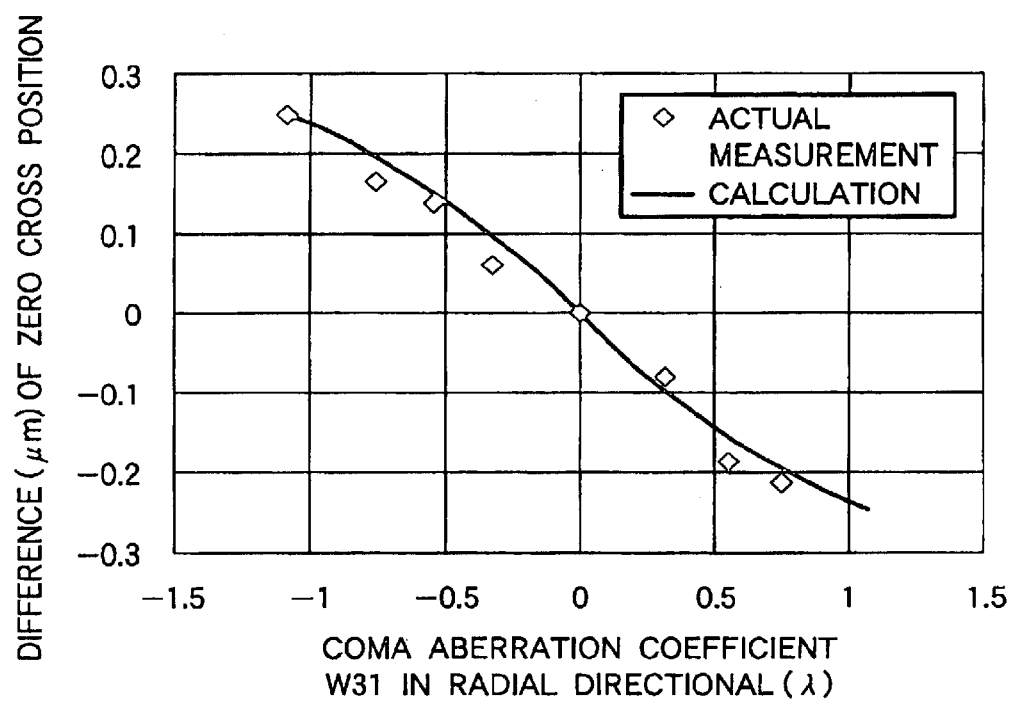
FIG. 10 is a graph showing a relation between a coma aberration amount and a difference amount between a zero-cross point of the tracking error signal in the inside region of the light flux and the that of tracking error signal in the outside region thereof.

Next, description will be made for a coma aberration signal to be actually obtained. By use of the principle experiment optical head in which the objective lens 109 of the optical head in the aforementioned embodiment is set to have NA of 0.65 and optimal substrate thickness of 0.6 mm, a relation between the coma aberration generated by inclining the optical disk medium in the radial direction and the coma aberration signal was measured. FIG. 9 is an oscilloscope photograph of tracking error signals 408, 409 when the coma aberration 0.68λ is provided in the disk radial direction. Due to the coma aberration in the disk radial direction, there occurs a difference between a zero-cross point of the tracking error signal in the inside region and a zero-cross point of the tracking error signal in the outside region. The signal corresponding to the difference of these zero-cross signals is obtained as a coma aberration signal 414. FIG. 10 shows an actual measured value of a difference amount of the zero-cross point when the coma aberration to be provided is changed and a calculation value by a computer simulation. Unit for the axis of abscissa in FIG. 10 is one wavelength (λ) of laser beam. The actual measured value corresponds with the calculation value well, and it is proved that it is possible to obtain the coma aberration signal substantially proportional to the coma aberration amount provided in this range.

When the spherical aberration correction amount is ±1.26λ, the coma aberration generated in offset of ±300 μm is ±0.756λ, and thus it is possible to sufficiently accurately detect the coma aberration amount in this range from the aforementioned experimental example. According to this embodiment, the coma aberration signal is set as a drive signal, and the coma aberration correction device 103 is driven so that the coma aberration is made as small as possible on the information recording surface of the optical disk medium 110. Since the coma aberration can be reduced to about ⅓ by the coma aberration correction device using the liquid crystal aberration correction device, the coma aberration generated in offset of ±300 μm is ±0.252λ, and the rms wave front aberration due to the offset coma aberration is set to 0.03λ or less. Furthermore, by further fining a segment division of the liquid crystal device, or using a system called a gradation type, in which a phase changes gradually, for the phase change amount shape, it becomes possible to further reduce the coma aberration. Therefore, it is possible to increase the correctable spherical aberration amount. Even in the case of correcting the spherical aberration generated at the time of recording/reproducing to and from a two-layer or more multilayer recording medium, if the optical head according to the embodiment of the present invention is employed, it is possible to constitute the optical disk apparatus requiring no double servo.

Figure 11:
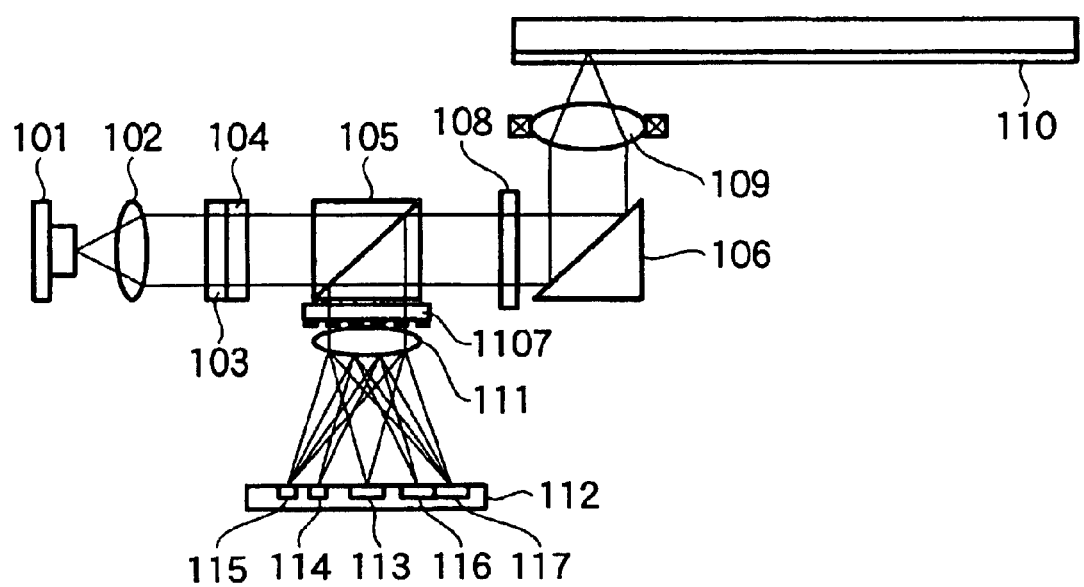
FIG. 11 is a view showing a modification example of the optical head of this embodiment.

A modification example of this embodiment will be explained by use of FIG. 11. According to this modification example, a diffraction grating 1107 is used instead of the polarizing diffraction grating 107 of FIG. 1. The diffraction grating 107 is deposited in an optical path between the detection lens 111 and the polarizing beam splitter 105. Furthermore, the ¼ wavelength plate 108 is deposited on an optical path between the polarizing beam splitter 105 and the objective lens 109. Comparing with the example of FIG. 1, it becomes unnecessary that the polarizing diffraction grating and the ¼ wavelength plate are mounted on an objective lens actuator, thus forming a structure suitable for further increasing the speed. Incidentally, the substantially same structure as in the embodiment of FIG. 1 is used for the division pattern of the diffraction grating.

Figure 12:
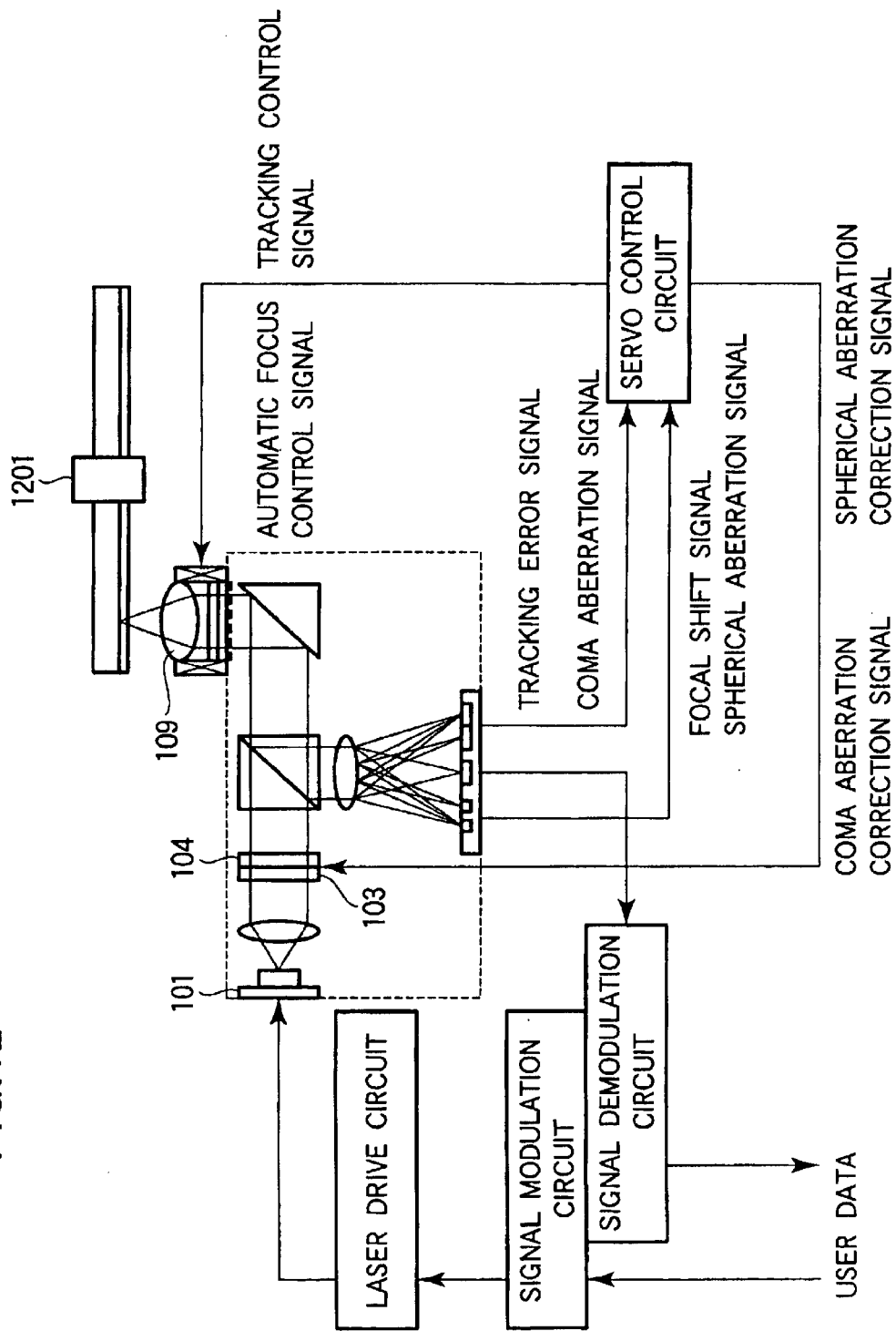
FIG. 12 is a view showing an embodiment of an optical disk apparatus using the optical head of the present invention.

Next, an embodiment of the optical disk apparatus using the optical head of the present invention will be described with reference to FIG. 12. This optical disk apparatus is constituted by the optical head in the aforementioned embodiment; a spindle motor 1201 for rotatably driving the optical disk medium; a signal demodulation circuit for demodulating a user data from a reproducing signal; a servo control circuit for making various controls; a signal modulation circuit for making pattern conversion for recording the user data to the optical disk medium; and a laser drive circuit for controlling and driving light emission of the laser 101 in accordance with a pattern signal.

The focal shift signal output from the optical head is input to the servo control circuit, and an automatic focus control signal is generated so that the optical spot comes to an optimal focal position on the optical disk medium, thus driving the actuator mounting the objective lens 109 in the optical axis direction. The tracking shift signal is input to the servo control circuit, and the tracking control signal is generated so that the optical spot carries out recording and reproducing at the center of the track on the optical disk medium, thus driving the actuator mounting the objective lens 109 in the radial direction of the optical disk medium. The spherical aberration signal is input to the servo control circuit, and the spherical aberration correction signal is generated so that the optical spot gains a minimum spherical aberration on the optical disk medium, thus driving the spherical aberration correction device 104. The coma aberration signal is input to the servo control circuit, and the coma aberration correction signal is generated so that the optical spot gains a minimum coma aberration on the optical disk medium, thus driving the coma aberration correction device 103. Even in the case of correcting the spherical aberration generated at the time of recording and reproducing to and from the two-layer or more multilayer recording medium, if the optical disk apparatus according to the present invention is used, it is possible to reduce the coma aberration generated due to the tracking operation of the objective lens, and to form a structure requiring no double servo.

According to the present invention, when the spherical aberration due to the substrate thickness error, or the spherical aberration generated at the time of recording and reproducing to and from the multilayer recording medium is corrected, even if the coma aberration occurs due to the tracking operation of the objective lens, the coma aberration is detected with good accuracy and the correction is made by feeding back to the coma aberration compensation mechanism. Therefore, it is possible to maintain the high quality of the condensing spot and to carry out the recording and reproducing to and from the high density optical disk stably.

What is claimed is:

1. An optical head, comprising:

a laser beam source;

an objective lens for condensing beam from said laser beam source on an optical disk; and a detector for detecting reflected light from said optical disk, wherein said optical head further comprises:

means for generating a first focal shift signal and a first tracking shift signal by use of an inside light flux containing a light flux center of The reflected light out of the reflected light from said optical disk, and means for generating a second focal shift signal and a second tracking shift signal by use of an outside light flux enclosing said inside light flux out of the reflected light from the optical disk, and wherein a spherical aberration signal is generated based on a difference between said first focal shift signal and said second focal shift signal, and a coma aberration signal is generated based on a difference between said first tracking shift signal and said second tracking shift signal.

2. An optical head, comprising:

a laser beam source;

an objective lens for condensing beam from the laser beam source on an optical disk;

variable focusing means for moving a focal position of an optical spot condensed by said objective lens;

tracking means for making the optical spot track a recording track of the optical disk;

a light detector for detecting reflected light from the optical disk; and an operation circuit for generating a reproducing signal, a focal shift signal and a tracking shift signal by use of a detection signal of said light detector, wherein said optical head further comprises: a detected light dividing device for dividing a light flux in the vicinity of an optical axis of said reflected light into a plurality of partial light fluxes to make incident onto said light detector, and also dividing the light flux in a peripheral portion of said reflected light into a plurality of partial light fluxes to make incident onto said light detector, and wherein said operation circuit generates: a first focal shift signal and a first tracking shift signal based on the detection signal of the partial light fluxes derived from said light flux in the vicinity of the optical axis; a second focal shift signal and a second tracking shift signal based on the detection signal of the partial light fluxes derived from said light flux of the peripheral portion; a spherical aberration signal in accordance with a difference signal between said first and second focal shift signals, and a focal shift signal in accordance with a sum signal; and a coma aberration signal in accordance with a difference signal between said first and second tracking shift signals, and a tracking shift signal in accordance with a sum signal.

3. The optical head according to claim 2, wherein said detected light dividing device is divided into 8 regions by a circle, a straight line passing a center of the circle and parallel to a direction relevant to a radial direction of the optical disk, and a straight line passing a center of the circle and parallel to a direction relevant to a revolution direction of the optical disk, and said respective regions are diffraction gratings or polarizing diffraction gratings having different diffraction angles and diffraction directions from each other.

4. The optical head according to claim 3, wherein said light detector has a plurality of light-receiving regions provided in one substrate, generates a reproducing signal from a zero-order diffraction light detection signal of said detected light dividing device, and generates a focal shift signal and a tracking shift signal from ±first-order diffraction light detection signals.

* * * * *